United States Patent Office 2,816,118
Patented Dec. 10, 1957

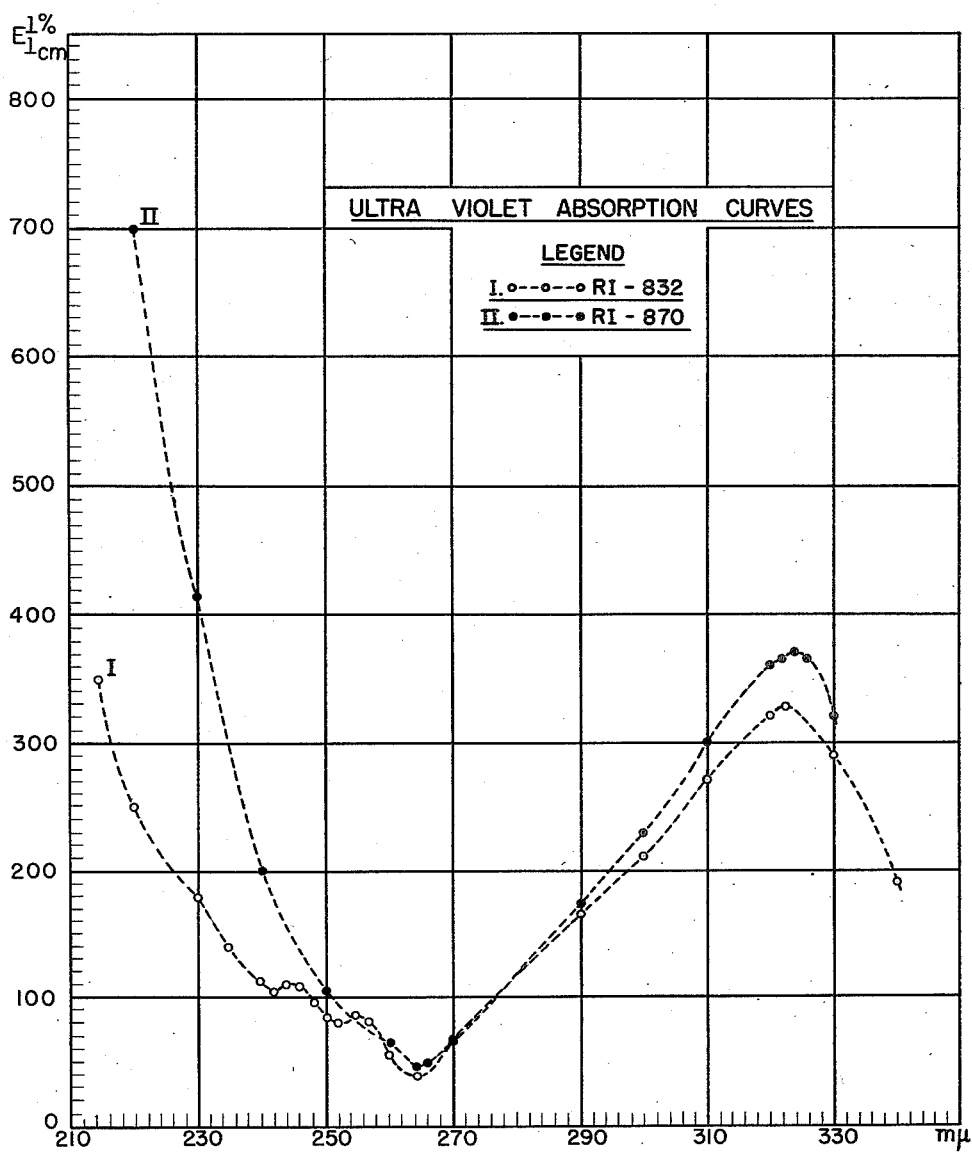

2,816,118

ISOLATION OF CRYSTALLINE COMPONENTS FROM VISNAGAN

Eric Smith, Fairlawn, and Karl Kurt Haber, Jersey City, N. J., assignors to S. B. Penick & Company, Incorporated, New York, N. Y., a corporation of Delaware Application November 12, 1953, Serial No. 391,594

4 Claims. (Cl. 260—345.2)

Our invention relates to an improvement in the isolation and identification of the components of extracts from the seeds of *Ammi visnaga* L., an umbelliferous plant. More particularly, the invention is concerned with an improvement in the resolution of the "Visnagan" fraction of these extracts, and with the isolation of crystalline substances from that fraction by an improved method of chromatography.

Since ancient times the fruit of the plant *Ammi visnaga* L. has been used as a folk remedy in the treatment of various ailments such as spasms of the ureter, for removal of calculi, and as a diuretic. Recent pharmacological and clinical tests have confirmed these old uses. Thus, the major fraction of the total active principles of *Ammi visnaga* L. which is known as Khellin, was separated in crystalline form and found to be a good dilatory agent but to cause undesirable side reactions. Another known extract, the amorphous "Visnagan" fraction, is an ether-soluble by-product of Khellin manufacture. K. Samaan has isolated it in its crude form as a dark, oily liquid which distills with decomposition (Quart. J. Pharm. Pharmacol. 4, 14, 1931; ibid. 6, 13, 1933). C. J. Cavallito and H. E. Rockwell obtained from this oily liquid only an amorphous, glassy product which proved approximately twice as active as Khellin on the isolated rabbit heart (J. Org. Chem. 15, 820, 1950). Samaan isolated the dark, oily liquid "in about 2% yield from the seeds," and Cavallito and Rockwell state that the colorless, hard glass "constitutes somewhat less than half of the crude visnagan product."

It seemed desirable to us, for the purpose of accurate clinical tests of the "Visnagan" fraction, to attempt to isolate its components in pure crystalline form. However, we found no information in the disclosures of Samaan and of Cavallito and Rockwell as to how this object can be accomplished. Samaan obtained the "Visnagan" fraction from the fruit of *Ammi visnaga* L. as a greenish, oily liquid. Cavallito and Rockwell purified that liquid by fractional precipitation from organic solvents and the removal of all components capable of reacting with hydrochloric acid in ethereal solution. They thus produced a resinous material which they chromatographed on a silica column, using ether as developer and an ether-ethanol mixture as eluent. In that manner, they isolated a glassy, amorphous product which they were unable to crystallize, although it had an apparent molecular weight of 404. We repeated this method with a similar initial material and obtained the same amorphous product.

It appears, therefore, that the "Visnagan" fraction is a very complex mixture of coloring matters, fatty constituents, oils and physiologically active components, the exact number and nature of which, their relative proportions in the mixture, and behavior in resolution procedures was unknown at the time of our invention. It is generally recognized that while chromatography is one of the most useful methods for the resolution of mixtures and for the isolation and identification of the components, the selection of adsorbents and solvents is a difficult problem since "few simple principles have been developed to serve as a guide" and "even with this kind of information on hand, the resolvability of mixtures of unknown substances must be tested by empirical methods" (Kirk-Othmer, Encyclopedia of Chemical Technology, vol. 3, 1949, pages 933 to 934). Moreover, known chromatographic techniques have for the most part been developed in the laboratory and their adaptation to production scales has not so far been successful.

We have now discovered that it is possible to isolate pure, crystalline compounds from the amorphous "Visnagan" fraction by a columnar adsorption method which has proven successful both in the laboratory and in production. Broadly speaking, we have found that crystalline components are separated from the amorphous "Visnagan" fraction when, after removal of coloring matters, fatty constituents, solvents and certain components capable of forming oxonium salts, the remaining amorphous material is chromatographed with substantially water-insoluble organic solvents on an adsorbent employed in an amount of not less than about ten times the amount of said material. We have found that in that manner the purified amorphous "Visnagan" fraction is resolved into its crystallizable components in one operation.

We prefer to wash the charged column with a single substantially water-insoluble organic solvent and then to develop and fractionally to elute the column with mixtures of substantially water-insoluble organic solvents of increasing polarity. We have found that pentane-ether mixtures of increasing ether content are highly selective eluents. Silica gel is the most useful adsorbent in our process.

The amorphous "Visnagan" fraction which we use as initial material in our chromatographing process is obtained from a concentrated benzene extract of *Ammi visnaga* seeds. This concentrate is extracted with a water-insoluble organic solvent, preferably ether or pentane, and the Khellin and most of the fraction known as Visnagin remains in the benzene concentrate as a sandy powder. The ether extract is concentrated and the concentrate is dissolved in 80% alcohol and the solution extracted with pentane. Or if pentane was used as extractant, the extract is concentrated and dissolved in 80% alcohol. In either case, the alcoholic solution is then treated with basic lead acetate to remove impurities. After de-leading the solution with sodium phosphate or hydrogen sulfide, if desired, the alcoholic solution is concentrated in vacuo, the residue is taken up in absolute ether and treated with ethereal hydrogen chloride whereby components capable of forming oxonium salts are precipitated; these hydrochlorides are removed by filtration. The filtrate is washed with aqueous sodium carbonate solution, dried over sodium sulfate and concentrated to a light syrup which amounts to 25% of the concentrate used. This syrup was then fractionally chromatographed.

The following examples illustrate this chromatographing process:

*Example 1.*—Syrup lot RI–811 was mixed with filter cell in the proportion of 1:1, the mixture was dried and an aliquot amount corresponding to 3291 grams of the syrup was put on a silica column weighing about thirty times as much as the syrup and previously wetted with pentane.

The column was first washed wtih pentane alone. The concentrated pentane extract yielded 59 grams of an oil. Next, the column was developed and fractionally eluted with pentane-ether mixtures of increasing ether content. The fractions were cut from the eluates on the basis of spectrophotometric assays in which 0.1 ml. of eluate was diluted with 9.9 ml. U. S. P. alcohol and read in a Beckman spectrophotometer against U. S. P. alcohol in a blank cell, and they were then concentrated and bulked as follows:

(a) Ether content 10–23%:                     Grams
    Oil _____ 602
    Crystalline compound RI-860 _____ 20.7
(b) Ether content 23–25%:
    Oil _____ 35
    Crystalline compound RI-860 _____ 5.7
(c) Ether content 25%:
    Pure, crystalline compound RI-832 _____ 249
    Oil _____ 122.7
    Crystalline compounds {RI-860 / RI-870} _ 22.4
(d) Ether content 30%:
    Oil _____ 127
    Crystalline compound RI-870 _____ 214

Total _____ 1398.5

*Example 2.*—Another group, lot RI-811-9, was mixed with filter cel in the proportion of 1:1.5. This mixture which contained a total of 3600 grams of syrup, was put on a silica column weighing about 15 times as much as the syrup and previously wetted with pentane.

The column was then washed with pentane; the pentane concentrate yielded 60 grams of oil. The column was then developed and eluted with pentane-ether mixtures as in Example 1, using the increasing ether contents indicated below and yielding the following products in bulk:

(a) Ether content 10–25%:                     Grams
    Oil _____ 238
    Intensely yellow colored body _____ 5.6
    Crystalline compound RI-860 _____ 3.5
(b) Ether content 25%:
    Oil _____ 374
    Crystalline compound RI-832 _____ 236
    Crystalline compound RI-870 _____ 293
(c) Ether content 30–50%:
    Oil _____ 728
    Crystalline compound RI-870 _____ 38
    Crystalline compound RI-778 _____ 182

Total _____ 2098.1

Continued elution of the columns with pentane-ether mixtures containing amounts of ether greater than 50% yielded dark-colored and, for the most part, resinous materials. We were able to isolate small amounts of Khellin and Visnagan from these resins.

These crystalline compounds were found to possess the following properties:

*RI-860.*—A crystalline compound having a melting point of 297–300° C., a specific rotation of $\alpha_D + 72°$ in ethanol, but no specific absorption in the ultraviolet range. This compound was found to reduce the flow of Ringer solution in the isolated rabbit heart, and it seems to be antagonistic to the action of Visnagin which increases the flow.

*Visnagan (RI-832).*—A crystalline compound having a melting point of 83–86° C., a specific rotation of $\alpha_D + 10 \pm 2$ in ethanol, an ultraviolet absorption spectrum showing an absorption minimum at 264 m$\mu$ and a maximum absorption at 322 m$\mu$ (Fig. 1), a molecular weight, determined cryoscopically, of 388 (calc. 376.45), and the probable formula $C_{21}H_{24}O_7$. Anal.: Calc. C 64.95, H 6.23; found C 64.99, H 6.21. Table I shows that the crystalline Visnagan possesses a vasodilatory effect on the isolated rabbit heart which is about eight times that of Khellin. Table II compares the toxicities of the two substances, and shows that the $LD_{50}$ of oral Visnagan is more than ten times lower than that of Khellin.

TABLE I

*Flow increase on isolated rabbit heart caused by crystalline Visnagan and Khellin (standard)*

| Compound | Concentration | Flow Percent Increase | Potency |
|---|---|---|---|
| Standard | 1:30,000 | 48 | 1 |
| RI-832/1* | 1:240,000 | 55 | 8 |
| Standard | 1:30,000 | 32 | 1 |
| RI-832/2* | 1:240,000 | 37.6 | 8 |
| Standard | 1:30,000 | 46.1 | 1 |
| RI-832/5* | 1:240,000 | 41.4 | 8 |
| Standard | 1:30,000 | 19.1 | 1 |
| RKP-190/1* | 1:240,000 | 22.7 | 8 |
| Standard | 1:30,000 | 40.9 | 1 |
| RKP-190/2* | 1:300,000 | 39.2 | 10 |

*Control numbers of lots of crystalline Visnagan.

TABLE II

*$LD_{50}$ in mouse mg./kg.*

Khellin oral _____ 180
RI-832/5* _____ >2000
Same, intravenous _____ 590

*Control number of a lot of crystalline Visnagan.

*RI-870.*—A crystalline substance having a melting point of 132–134° C. and a specific rotation of $\alpha_D + 24$ in ethanol. This substance showed an ultraviolet absorption closely similar to that of Visnagan but differing distinctly therefrom in its higher absorption at lower wave lengths (Fig. 1). It proved to be extremely toxic to the isolated rabbit heart, causing stoppage of the heart in a short time.

While the ether content of the pentane-ether mixtures employed in these examples increased from 10 to 50%, we have found that wider variations between about 2.5 and 50% are operable and give satisfactory results. In other chromatographic runs in which the eluates were more closely cut than in the above example, by the use of the spectrophotometric assay described above, we have also encountered small amounts of additional crystalline fractions which we did not further identify.

We have found that instead of pentane, other hydrocarbons such as hexane, can be employed in the solvent mixture. The syrupy initial material is admixed with filter cel, preferably in the proportion of 1:1, but a mixture containing 2 parts by weight of filter cel for one part by weight of syrup has been fractionally eluted with satisfactory results.

Thus, we have been able to prove that the crude, amorphous "Visnagan" fraction which could not be resolved into its components by the known methods, is indeed a highly complex mixture of amorphous constituents. Those skilled in the art know that it is difficult to resolve amorphous mixtures into their components and that is generally even more difficult to obtain pure, crystalline compounds from such mixtures. Nevertheless, after much experimentation, we have obtained the resolution of the crude "Visnagan" fraction and we have developed a new method of fractional elution, as described and claimed, which has enabled us, not only to isolate individual components, but also to obtain them in pure, crystalline form in only one chromatographing operation, particularly the pure, crystalline Visnagan which was isolated in good yields of up to about 8% and proved to be useful for clinical investigations, since it is considerably less toxic than Khellin and about 8 times more potent as a vasodilatory agent.

What we claim is:

1. The process of separating crystalline compounds from extracts of the seeds of *Ammi visnaga* L. substantially free from coloring matters, fatty constituents, solvents and components capable of forming oxonium salts which process comprises chromatographing the extracts in admixture with a filter cel on a silica gel column, first with pentane and then with pentane-ether mixtures of increasing ether content of betwen 2.5 to about 50 percent, the silica gel being employed in the amount of 10–100 times the amount of the extract.

2. The process of claim 1 in which the extracts are chromatographed with pentane-ether mixtures of increasing ether content of between about 10 to 30%, and the silica gel in the column has a weight about thirty times the weight of the extract.

3. The process of isolating crystalline compounds from extracts of the seeds of *Ammi visnaga* L. substantially free from coloring matters, fatty constituents, solvents and components capable of forming oxonium salts which process comprises admixing said extracts with filter cel in the proportion of 1:1 by weight, putting the mixture on a silica column in which the weight of the silicagel is about thirty times that of the extract, developing the column with pentane, and then fractionally eluting it with ether-pentane mixtures, first with a mixture containing from 10–23% of ether, and finally with a mixture containing from about 25–35% of ether, cutting from the resulting eluates two fractions and concentrating said fractions whereby the following products are obtained: (*a*) a crystalline substance melting at 83–86° C., having a specific rotation of $[\alpha]_D + 10 \pm 2$ in ethanol, an ultraviolet absorption spectrum showing a minimum of 264 m$\mu$ and a maximum of 322 m$\mu$, a molecular weight, determined cryoscopically, of 388, and the probable formula $C_{21}H_{24}O_7$; and (*b*) a crystalline substance melting at 132–134° C., having a specific rotation $[\alpha]_D + 24$ in ethanol, an ultraviolet absorption spectrum showing a minimum at 264 m$\mu$ and a maximum at 322 m$\mu$ and a strong end absorption against the lower wave length range, a molecular weight determined cryoscopically, of 386, and the probable formula $C_{21}H_{22}O_7$.

4. The process of separating crystalline compounds from extracts of *Ammi visnaga* L. substantially free from coloring matters, fatty constituents, solvents and components capable of forming oxonium salts which process comprises chromatographing the extracts in admixture with a filter cel on a silica gel column, first with a compound selected from the group consisting of pentane and hexane and then with a mixture selected from the group consisting of pentane-ether mixtures and hexane-ether mixtures, said mixtures having an increasing ether content of between 2.5 to about 50 percent, the silica gel being employed in the amount of 10–100 times the amount of the extract.

References Cited in the file of this patent

UNITED STATES PATENTS 2,608,560    Aschner et al. _____ Aug. 26, 1952

FOREIGN PATENTS 585,224    Great Britain _____ Feb. 3, 1947

OTHER REFERENCES

Quarendon: Mfg. Chemist and Mfg. Perfumer, vol. XIV, 8, pp. 251–254 (August 1943).

Cavallito et al.: J. Org. Chem. 15, pp. 820–823 (1950).

Smith et al.: Science 115, pp. 520–521 (May 1952).